United States Patent [19]
Cong et al.

[11] Patent Number: 6,044,343
[45] Date of Patent: *Mar. 28, 2000

[54] ADAPTIVE SPEECH RECOGNITION WITH SELECTIVE INPUT DATA TO A SPEECH CLASSIFIER

[75] Inventors: Lin Cong; Safdar M. Asghar, both of Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/883,978

[22] Filed: Jun. 27, 1997

[51] Int. Cl.⁷ .................................................. G10L 15/20

[52] U.S. Cl. ........................... 704/236; 704/256; 704/222; 704/243

[58] Field of Search .................................... 704/236, 222, 704/255, 256, 232, 243, 244, 245

[56] References Cited

U.S. PATENT DOCUMENTS

| | | | |
|---|---|---|---|
| 4,383,135 | 5/1983 | Scott et al. | 704/236 |
| 4,519,094 | 5/1985 | Brown et al. | 381/43 |
| 4,933,973 | 6/1990 | Porter | 381/43 |
| 4,975,955 | 12/1990 | Taguchi | 381/36 |
| 5,031,217 | 7/1991 | Nishimura | 381/43 |
| 5,046,099 | 9/1991 | Nishimura | 381/43 |
| 5,185,848 | 2/1993 | Aritsuka et al. | 395/2 |
| 5,228,087 | 7/1993 | Bickerton | 704/232 |
| 5,255,339 | 10/1993 | Fette et al. | 395/2 |
| 5,285,522 | 2/1994 | Mueller | 395/2.41 |
| 5,313,555 | 5/1994 | Kamiya | 395/2.42 |
| 5,414,796 | 5/1995 | Jacobs et al. | 395/2.3 |
| 5,583,888 | 12/1996 | Ono | 375/240 |
| 5,596,679 | 1/1997 | Wang | 704/236 |
| 5,625,747 | 4/1997 | Goldberg et al. | 395/2.52 |
| 5,696,878 | 12/1997 | Ono et al. | 395/2.59 |
| 5,734,793 | 3/1998 | Wang | 704/232 |

OTHER PUBLICATIONS

Lin Cong, Costas S Xydeas, and Anthony F Erwood, Combining Fuzzy Vector Quantization and Neural Network Classification for Robust Isolated Word Speech Recognition, Proceedings of ICCS '94: Singapore, IEEE, vol. 3, pp., 884–887 (Nov. 14–18, 1994).

C. S. Xydeas and Lin Cong, "Robust Speech Recognition using Fuzy Matrix Quantization, Neural Networks and Hidden Markov Models," Proc. of EUSIPCO–96, Eighth Eur. Sig. Proc. Conf.: Theor and Appl of Sig Proc, v3, p 1587–90, Trieste, Italy (Sep. 10–13, 1996).

Cong, Lin; "A Study of Robust IWSR Systems"; PhD Thesis submitted to The University of Manchester School of Engineering, Division of Electrical Engineering; Manchester, United Kingdom; pp. 1–209. May 1996.

Waibel, Alexander; "Neural Network Approaches for Speech Recognition"; Chapter 18 of *Advances in Speech Signal Processing;* edited by Sadaoki Furui and M. Mohan Sondhi; Marcel Dekker, Inc.; New York, New York; 1992; pp. 555–595.

(List continued on next page.)

*Primary Examiner*—David R. Hudspeth
*Assistant Examiner*—Donald L. Storm
*Attorney, Agent, or Firm*—Skjerven, Morrill, MacPherson, Franklin & Friel, LLP

[57] ABSTRACT

One embodiment of a speech recognition system is organized with speech input signal preprocessing and feature extraction followed by a fuzzy matrix quantizer (FMQ) designed with respective codebook sets at multiple signal to noise ratios. The FMQ quantizes various training words from a set of vocabulary words and produces observation sequences O output data to train a hidden Markov model (HMM) processes λj and produces fuzzy distance measure output data for each vocabulary word codebook. A fuzzy Viterbi algorithm is used by a processor to compute maximum likelihood probabilities PR(O|λj) for each vocabulary word. The fuzzy distance measures and maximum likelihood probabilities are mixed in a variety of ways to preferably optimize speech recognition accuracy and speech recognition speed performance.

35 Claims, 3 Drawing Sheets

OTHER PUBLICATIONS

Xydeas, C. S. and Cong, L.;"Combining Neural Network Classification with Fuzzy Vector Quantization and Hidden Markov Models for Robust Isolated Word Speech Recognition"; *Signal Processing VIII Theories and Applications,* vol. III; Proceedings of the IEEE International Symposium on Information Theory, IEEE Press, 1995, p. 174.

Xydeas, C. S. and Cong, L.; "Robust Speech Recognition in A Car Environment"; Presented at DSP95 International Conference on Digital Signal Processing, Jun. 26–28, 1995, Limassol, Cyprus; vol. 1, pp. 84–89.

Cong, Lin, Prof. C.S. Xydeas, and Anthony Ferwood; "A Study of Robust Isolated Word Speech Recognition Based on Fuzzy Methods"; Presented at EUSIPCO–94, VII European Signal Processing Conference, Sep. 13–16, 1994; Scotland, UK.; 4 pages.

Gibson, Jerry D.; "Coding, Transmission, and Storage"; Chapter 14, Speech Signal Processing, of *The Electrical Engineering Handbook;* Editor–in–Chief Richard C. Dorf; ©1993 by CRC Press, Inc.; pp. 279–314.

Gersho, Allen and Shihua Wang; "Vector Quantization Techniques in Speech Coding"; Chapter 2 of *Advances in Speech Signal Processing;* edited by Sadaoki Furui and M. Mohan Sondhi; Marcel Dekker, Inc.; New York, New York; 1992; pp. 49–84.

Kroon, Peter and Bishnu S. Atal; "Predictive Coding of Speech Using Analysis–by–Synthesis Techniques"; Chapter 5 of *Advances in Speech Signal Processing;* edited by Sadaoki Furui and M. Mohan Sondhi; Marcel Dekker, Inc., New York, New York; 1992; pp. 141–164.

Honda, Masaaki and Yoshinao Shiraki; "Very Low–Bit–Rate Speech Coding"; Chapter 7 of *Advances in Speech Signal Processing;* edited by Sadaoki Furui and M. Mohan Sondhi; Marcel Dekker, Inc.; New York, New York; 1992; pp. 209–230.

Schroeter, Juergen and M. Mohan Sondhi; "Speech Coding Based on Physiological Models of Speech Production"; Chapter 8 of *Advances in Speech Signal Processing;* edited by Sadaoki Furui and M. Mohan Sondhi; Marcel Dekker, Inc.; New York, New York; 1992; pp. 231–268.

Rabiner, Lawrence and Juang, Biing–Hwang; "Fundamentals of Speech Recognition" 1993; pp. 190–195.

Parsons, Thomas W.; "Voice and Speech Processing"; McGraw–Hill, Inc., New York, 1987; pp. 170–171.

Xydeas, C.S. and Lin Cong; "Robust Speech Recognition Using Fuzzy Matrix Quantization and Neural Networks"; Proceedings of International Conference on Communication Technology; Beijing, China—ICCT '96; pp. 432–435; IEEE; New York (May 5–7, 1996).

ADAPTIVE SPEECH RECOGNITION WITH SELECTIVE INPUT DATA TO A SPEECH CLASSIFIER

BACKGROUND OF THE INVENTION

1. Field of the Invention

This invention relates to speech recognition systems, more particularly to speech recognition systems providing selective input data to a speech classifier, such as neural network to balance speech recognition accuracy and speech recognition system performance.

2. Description of the Related Art

Speech is perhaps the most important communication method available to mankind. It is also a natural method for man-machine communication. Man-machine communication by voice offers a whole new range of information/communication services which can extend man's capabilities, serve his social needs, and increase his productivity. Speech recognition is a key element in establishing man-machine communication by voice, and, as such, speech recognition is an important technology with tremendous potential for widespread use in the future.

Voice communication between man and machine benefits from an efficient speech recognition interface. Speech recognition interfaces are commonly implemented as Speaker-Dependent (SD)/Speaker-Independent (SI) Isolated Word Speech Recognition (IWSR)/continuous speech recognition (CSR) systems. The SD/SI IWSR/CSR system provides, for example, a beneficial voice command interface for hands free telephone dialing and interaction with voice store and forwarding systems. Such technology is particularly useful in an automotive environment for safety purposes.

However, to be useful, speech recognition must generally be very accurate in correctly recognizing (classifying) the speech input signal with a satisfactory probability of accuracy. Difficulty in correct recognition arises particularly when operating in an acoustically noisy environment. Recognition accuracy may be severely and unfavorably impacted under realistic environmental conditions where speech is corrupted by various levels of acoustic noise.

FIG. 1 generally characterizes a speech recognition process by the speech recognition system 100. A microphone transducer 102 picks up a speech input signal and provides to signal preprocessor 104 an electronic signal representation of the speech input signal 101. The speech input signal 101 is an acoustic waveform of a spoken input, typically a word, or a connecting string of words. The signal preprocessor 104 may, for example, filter the speech input signal 101, and a feature extractor 106 extracts selected information from the speech input signal 101 to characterize the signal with, for example, cepstral frequencies or line spectral pair frequencies (LSPs).

Referring to FIG. 2, more specifically, feature extraction in operation 106 is basically a data-reduction technique whereby a large number of data points (in this case samples of the speech input signal 101 recorded at an appropriate sampling rate) are transformed into a smaller set of features which are "equivalent", in the sense that they faithfully describe the salient properties of the speech input signal 101. Feature extraction is generally based on a speech production model which typically assumes that the vocal tract of a speaker can be represented as the concatenation of lossless acoustic tubes (not shown) which, when excited by excitation signals, produces a speech signal. Samples of the speech waveform are assumed to be the output of a time-varying filter that approximates the transmission properties of the vocal tract. It is reasonable to assume that the filter has fixed characteristics over a time interval of the order of 10 to 30 milliseconds (ms). Thus, a short-time speech input signal portion of speech input signal 101 may be represented by a linear, time-invariant all pole filter designed to model the spectral envelope of the signal in each time frame. The filter may be characterized within a given interval by an impulse response and a set of coefficients.

Feature extraction in operation 106 using linear predictive (LP) speech production models has become the predominant technique for estimating basic speech parameters such as pitch, formants, spectra, and vocal tract area functions. The LP model allows for linear predictive analysis which basically approximates a speech input signal 101 as a linear combination of past speech samples. By minimizing the sum of the squared differences (over a finite interval) between actual speech samples and the linearly predicted ones, a unique set of prediction filter coefficients can be determined. The predictor coefficients are weighting coefficients used in the linear combination of past speech samples. The LP coefficients are generally updated very slowly with time, for example, ever; 10–30 ms, to represent the changing vocal tract. LP prediction coefficients are calculated using a variety of well-known procedures, such as autocorrelation ard covariance procedures, to minimize the difference between the actual speech input signal 101 and a predicted speech input signal 101 often stored as a spectral envelope reference pattern. The LP prediction coefficients can be easily transformed into several different representations including cepstral coefficients and line spectrum pair (LSP) frequencies. Details of LSP theory can be found in N. Sugamura, "Speech Analysis and Synthesis Methods Developed at ECL in NTT-from LPC to LSP", Speech Communication 5, Elsevier Science Publishers, B. V., pp. 199–215 (1986).

Final decision-logic classifier 108 utilizes the extracted information to classify the represented speech input signal to a database of representative speech input signals. Speech recognition classifying problems can be treated as a classical pattern recognition problem. Fundamental ideas from signal processing, information theory, and computer science can be utilized to facilitate isolated word recognition and simple connected-word sequences recognition.

FIG. 2 illustrates a more specific speech recognition system 200 based on pattern recognition as used in many IWSR type systems. The extracted features representing speech input signal 101 are segmented into short-term speech input signal frames and considered to be stationary within each frame for 10 to 30 msec duration. The extracted features may be represented by a P-dimensional vector and compared with predetermined, stored reference patterns 208 by the pattern similarity operation 210. Similarity between the speech input signal 101 pattern and the stored reference patterns 208 is determined in pattern similarity operation 210 using well-known vector quantization processes. The vector quantization process yields spectral distortion or distance measures to quantify the score of fitness or closeness between the representation of speech input signal 101 and each of the stored reference patterns 208.

Several types of spectral distance measures have been studied in conjunction with speech recognition including LSP based distance measures such as the LSP Euclidean distance measure (dLSP) and weighted LSP Euclidean distance measure (dWLSP). They are defined by $$dLSP = \sum_{i=1}^{P} (f_R(i) - f_S(i))^2$$

and $$dWLSP = \sum_{i=1}^{P} w(i)(f_R(i) - f_S(i))^2$$

where, $f_R(i)$ and $f_S(i)$ are the ith LSPs of the reference and speech vectors, respectively. The factor "w(i)" is the weight assigned to the ith LSP and P is the order of LPC filter. The weight factor w(i) is defined as:

$$w(i) = [P(f_S(i))]^r$$

where P(f) is the LPC power spectrum associated with the speech vector as a function of frequency, f, and r is an empirical constant which controls the relative weights given to different LSPs. In the weighted Euclidean distance measure, the weight assigned to a given LSP is proportional to the value of LPC power spectrum at this LSP frequency.

The decision rule operation 212 receives the distance measures and determines which of the reference patterns 208 the speech input signal 101 most closely represents. In a "hard" decision making process, speech input signal 101 is matched to one of the reference patterns, 208. This one-to-one "hard decision" ignores the relationship of the speech input signal 101 to all the other reference patterns 208. Fuzzy methods have been introduced to provide a better match between vector quantized frames of speech input signal 101 and reference patterns 208. In a "soft" or "fuzzy" decision making process, speech input signal 101 is related to one or more reference patterns 208 by weighting coefficients.

Matrix quantization has also been used to introduce temporal information about speech input signal 101 into decision rule operation 212. Fuzzy analysis methods have also been incorporated into matrix quantization processes, as described in Xydeas and Cong, "Robust Speech Recognition In a Car Environment", Proceeding of the DSP95 International Conference on Digital Signal Processing, Jun. 26–28, 1995, Limassol, Cyprus. Fuzzy matrix quantization allows for "soft" decision using interframe information related to the "evolution" of the short-term spectral envelopes of speech input signal 101.

However, speech recognition technology still does not have a perfect recognition accuracy, and recognition accuracy particularly declines as acoustic signal to noise ratios (SNR) decrease. Also, speech recognition system performance declines as more vocabulary words; are targeted for recognition. Accordingly, a need exists to improve speech recognition accuracy. Additionally, a need exists to increase the overall speed performance of speech recognition systems while maintaining satisfactory speech recognition accuracy.

SUMMARY OF THE INVENTION

In one embodiment, speech recognition system accuracy and performance may be balanced by, for example, providing multiple sources of speech input signal information to a speech classifier of a higher processing level such as a neural network. Furthermore, in one embodiment, speech recognition system speed performance may be selectively enhanced without substantial compromise in speech recognition accuracy by selectively providing less speech input signal information to a speech classifier when, for example, a speech input signal is corrupted by high SNR levels, where the increased recognition gains achieved by providing more information to the speech classifier are offset by the speech recognition system processing speed penalty. Additionally, speech recognition system speed performance may be selectively enhanced without substantial compromise in speech recognition accuracy by selectively providing less speech input signal information to a speech classifier when speed performance is noticeably degraded by, for example, using a large number of vocabulary words that strain available computational resources.

In one embodiment of the present invention, a speech recognition system includes a first speech signal preprocessor to receive first input data representing a speech input signal and having first speech input signal preclassifying output data and a second speech signal preprocessor to receive second input data representing the speech input signal and having second speech input signal preclassifying output data. The speech recognition system further includes a mixer to receive the first and second speech input signal preclassifying output data and having output data represented by a selected mix of the first and second speech input signal preclassifying output data and a speech classifier to receive the selected mix of the first and second word preclassifying output data and having output data to classify the speech input signal.

In another embodiment of the present invention, a speech recognition method includes the steps of processing first speech input signal data to preclassify the speech input signal and produce first preclassification output data, wherein the first speech input signal data represents a speech input signal, processing second speech input signal data to preclassify the speech input signal and produce second preclassification output data, and determining a preferred mix of the preclassification output data. The method further includes the steps of mixing the first and second preclassification output data in accordance with the determined preferred mix and classifying the speech input signal based on the preferred mix of preclassification output data.

BRIEF DESCRIPTION OF THE DRAWINGS

Features appearing in multiple figures with the same reference numeral are the same unless otherwise indicated.

DETAILED DESCRIPTION OF THE PREFERRED EMBODIMENTS

The following description of the invention is intended to be illustrative only and not limiting.

Figure 1:
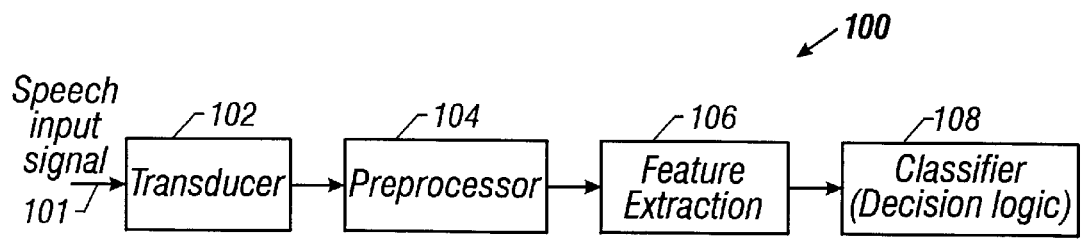
FIG. 1, labeled prior art, illustrates a general speech recognition system.
Figure 2:
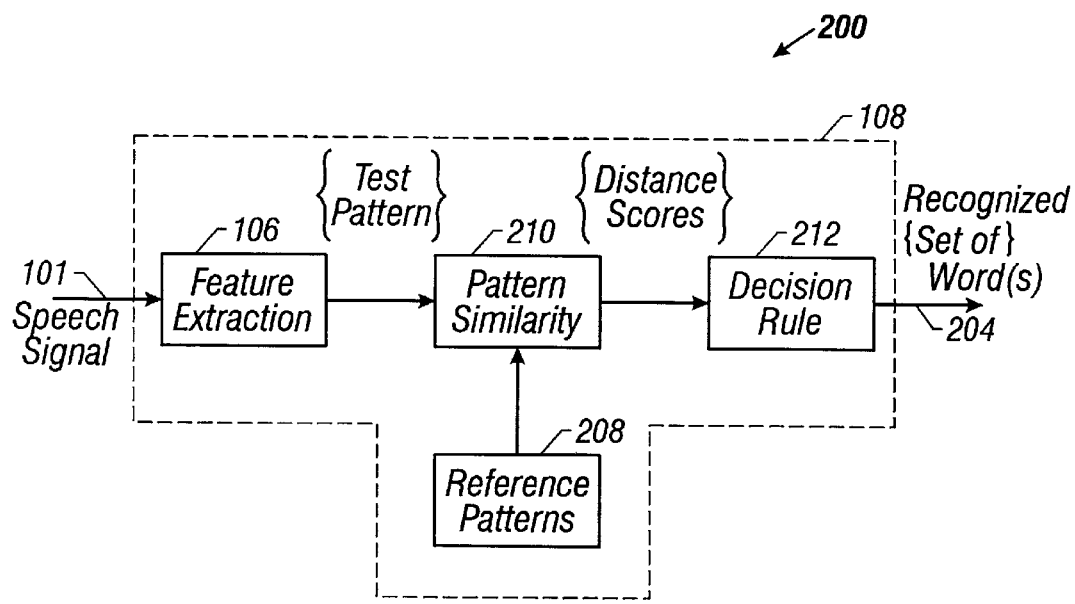
FIG. 2 illustrates a pattern-recognition based speech recognition system.
Figure 3:
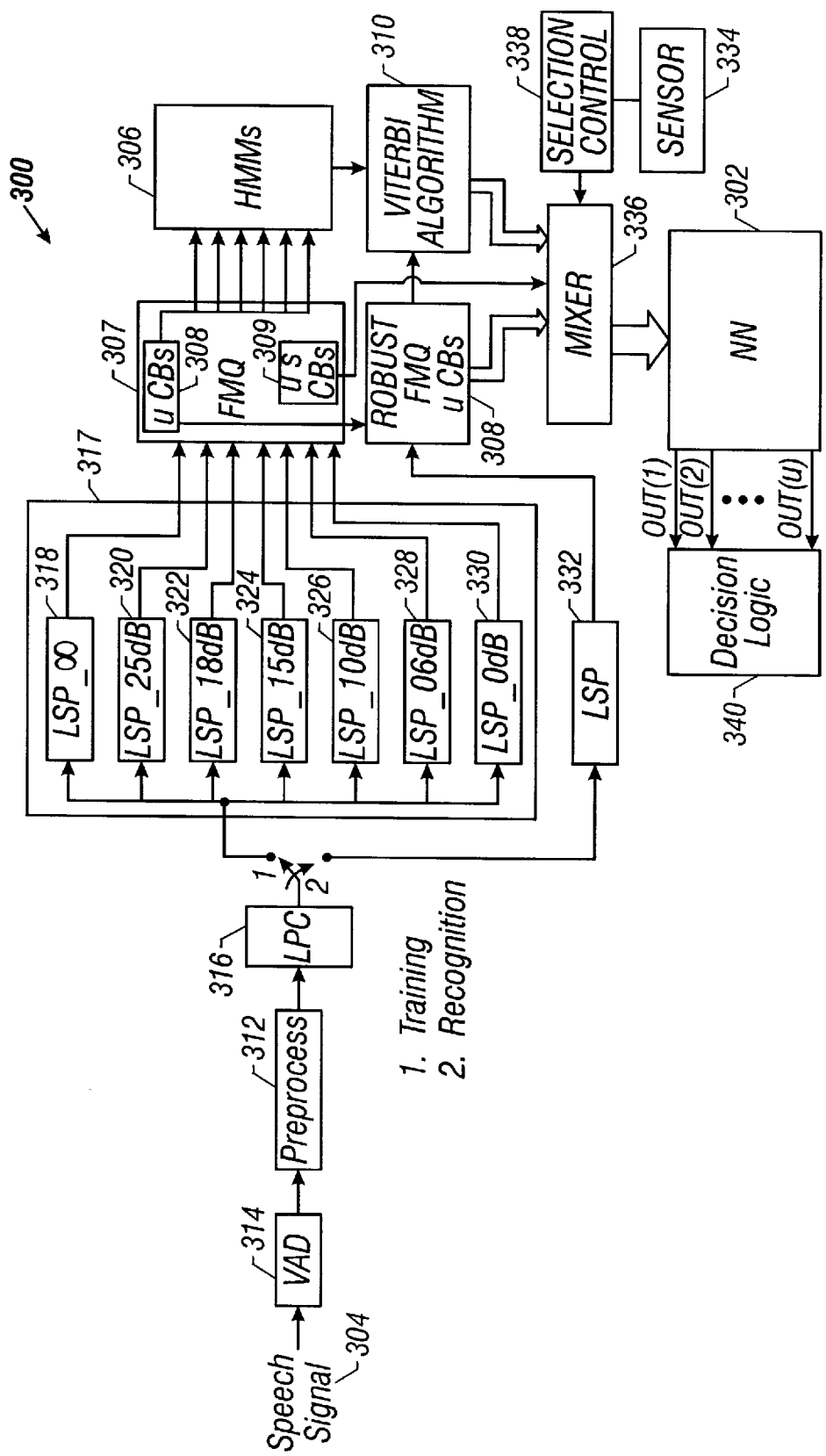
FIG. 3 illustrates an FMQ/HMM/NN speech recognition system embodiment with selective data input to the NN using a single codebook per vocabulary word per SNR level for training.

This description uses the following abbreviations:

FMQ—Fuzzy Matrix Quantization
FVQ—Fuzzy Vector Quantization
MQ—Matrix Quantization
HHM—Hidden Markov Model
λ—a HMM process Pr(O|λ)—Probability of model/process λ producing observation O
NN—Neural network
MLP—Multilevel Perceptron neural network
LSP—Line Spectral Pair
Db—decibel
FD—Fuzzy distance measure
IWSR—Isolated Word Speech Recognition
SNR—Signal to Noise Ratio Referring to an embodiment of a speech recognition system in FIG. 3, IWSR speech recognition system 300 combines the classification power of speech classifier neural network 302 with temporal distortion and probability information derived from frames of input speech signal 304 with speech preprocessors to classify speech signal 304 from a predetermined set of vocabulary words. Additionally, speech recognition system 300 includes noise level detection circuitry and MLP neural network 302 input data selection control :o dynamically yield satisfactory recognition accuracy while tailoring recognition process speed performance to a user environment. In preparation for IWSR, speech recognition system 300 undergoes a training process of designing FMQ 309 codebooks and robust FMQ 308 codebooks, training u hidden Markov models in preclassifier HMMs 306, and training neural network 302. A data base of u words repeated r times and corrupted by s different levels of acoustic noise is used during the training process, where u corresponds to a number of vocabulary words of speech recognition system 300, and s and r are positive integers, for example, seven and thirty, respectively.

Speech recognition system 300 is designed to classify an input speech signal 304 word as one of u predetermined vocabulary words. During training, the FMQ 307 is a front end to HMMs 306 and MLP neural network 302. Speech recognition system 300 uses an observation sequence $O_n$ of probability mass vectors from FMQ 307 to train the HMMs 306 and uses mixed input data which may have fuzzy distance measures to train MLP neural network 302. Signal modeling based on HMMs 306 can be considered as a technique that extends conventional stationary spectral analysis principles to the analysis of the quantized time-varying speech input signal 304. The time-varying quantized properties of speech input signal 304 are used by HMMs 306 and Viterbi algorithm 310 to describe speech signal 304 probabilistically.

Initially during training of speech recognition system 300, for each of u vocabulary words, an FMQ codebook in FMQ 307 is designed from a database of u times r (ur) words for each of s SNR levels. FMQ 307 uses the us codebooks 309 for training neural network 302 using the us database at each of the s SNR levels. Thus, a total training database has u times r times s (urs) entries. Each of the u times s times r (usr) words is input to speech recognition system 300 as speech input signal 304 and preprocessed by preprocess operation 312 which, for example, band limits speech signal 304 to 3.6 kHz and samples speech signal 304 at 8 ksamples/sec with a resolution of 16 bits per sample. During speech recognition, when continuous speech is produced, voice activity detector (VAD) 314 effectively defines end points of input words for IWSR. A P order linear predictive code (LPC) analysis is performed in LPC operation 316 on a 20 msec frame of speech signal 304 with a 10 msec overlap between frames to compute the LPC coefficients for the speech signal 304 frame using, for example, the Burg algorithm. P may vary depending on trade offs between desired resolution and processing speed and in this embodiment, X is assumed to be in the range often to sixteen. Frame times may vary and are, in general, chosen to represent an approximately static vocal tract period in a range of, for example, 10–30 msec. The training process follows the path through path position 1, to LSP operation 317 where line spectral pair frequencies are derived in a well-known manner from the respective LPC coefficients. LSP_(SNR) operations 318, 320, 322, 324, 326, 328, and 330 indicate that line spectral pair frequencies (coefficients) are generated by LSP operation 317 for each speech signal 304 frame for all seven SNR levels from the LPC coefficients.

In the embodiment of FIG. 3, the respective SNR levels used to train speech recognition system 300 are clean speech (∞), 35 dB, 25 dB, 24 dB, 18 dB, 12 dB, and 6 dB to model various noises in an automotive environment. Other SNR values may be chosen to model other speech environments or more extensively model the automotive environment. Speech recognition system 300 is designed for robustness by training with multiple acoustic noise SNR corruption levels to better model realistic speech signal 304 input conditions where speech is corrupted by acoustic noise.

The LSP representations of speech signal 304 are used to define a spectral envelope because they provide a robust representation of the speech short-term magnitude spectral envelope of speech signal 304. Band limited input distortion affects only a subset of LSP coefficients, as compared to the case of a cepstral representation where input noise corrupts all the coefficients. Additionally, LSP parameters have both well-behaved dynamic range and filter stability preservation properties and can be coded more efficiently than other parameters. As a result, the LSP representation can lead to a 25–30% bit-rate reduction in coding the filter (vocal tract) information, as compared to the cepstral coefficient representation. Furthermore, spectral LSP sensitivities are localized, i.e., a change in a given LSP produces a change in the LP power spectrum only in its neighborhood frequencies. For example, a change in an LSP from 1285 Hz to 1310 Hz affects the LP power spectrum near 1300 Hz. This is particularly useful when speech is corrupted by narrow band noise in which case only a subset of LSP parameters are affected by the input noise.

In general given a short segment of speech signal 304 and the corresponding all-pole filter H(z)=G/A(z), where A(z) is the inverse filter given by $$A(z)=1+a_1z^{-1}+a_2z^{-2}+\ldots+a_Pz^{-P}$$

where P is the order of the predictor and $\{a_i\}$ are the prediction coefficients, the LSPs are defined by decomposing the inverse filter polynomial into two polynomials, $$P(z)=A(z)+z^{-(P+1)}A(z-1),$$

and $$Q(z)=A(z)-z^{-(P+1)}A(z-1),$$

where P(z) is a symmetric polynomial, Q(z) is an anti-symmetric polynomial and $$A(z)=\tfrac{1}{2}[P(z)+Q(z)].$$

The roots of the polynomials P(z) and Q(z) define the LSP frequencies.

Each of the us FMQ 309 codebooks for a given vocabulary word is designed by developing a matrix entry from a corresponding speech signal 304 input word $W_{nkm}$, n=1, 2, . . . u, k=1, 2, . . . , s, m=1, 2, . . . , r, from the database of usr words. The r matrix entries for each of the u words at each of the s SNR levels are used to design the us respective FMQ 309 codebooks for a respective group of r matrix entries. Each of the us groups is processed to optimally cluster each of the r entries for each separate codebook into C cells. A centroid is computed for each of the C cells for minimum quantization distortion using, for example, a Fuzzy C-algorithm or a fuzzy Linde-Buzo-Gray (LBG) algorithm as illustratively discussed in chapter 3, section 3.3.4 of the Doctor of Philosophy thesis of Lin Cong entitled "A Study of Robust IWSR Systems" and located in the John Rylands University Library of Manchester in Manchester, England, which thesis is hereby incorporated by reference in its entirety, and further illustratively discussed in C. S. Xydeas and Lin Cong, "Robust Speech Recognition Using Fuzzy Matrix Quantisation, Neural Networks and Hidden Markov Models", pp. 1587–1590, EUSIPCO-96, Vol. 1, September, 1996, which is also incorporated by reference in its entirety. Thus, us matrix codebooks (MCBnk) in FMQ 307 are formed.

The u FMQ 308 codebooks are also designed by developing a matrix entry for each input word $W_{nkm}$, n=1, 2, . . . u, k=1, 2, . . . , s, m=1, 2, . . . , r, from the database of urs words. The sr matrix entries for each of the u words are processed to optimally cluster each entry into C cells. A centroid for each of the C cells is computed for each of the u FMQ 308 separate codebooks for minimum quantization distortion using, for example, the fuzzy C-algorithm or the fuzzy Linde-Buzo-Gray (LBG) algorithm as discussed in chapter 3, section 3.3.4 of the Doctor of Philosophy thesis of Lin Cong entitled "A Study of Robust IWSR Systems".

The us codebooks 309 and u codebooks 308 utilize interframe information related to the "evolution" of the speech short-term spectral envelopes of speech signal 304 by operating on N consecutive speech frames of speech signal 304. The us codebooks 309 and u codebooks 308 are designed separately using the database urs words. However, the following representation and quantization of word $W_{nkm}$ generically represent the training of and quantization with codebooks 309 and 308.

Each frame is represented by P LSP coefficients, and, thus, an N frames speech input signal segment provides a P×N matrix of LSP coefficients. Each matrix entry for a speech signal 304 input word $W_{nkm}$ may be designed using a training set of TO speech spectral vectors for each of TO frames of each speech signal 304 word $W_{nkm}$, which result in a set X={$x_1,x_2, \ldots ,x_T$} of T, P×N matrices for each speech signal 304 word $W_{nkm}$, where T=int(TO/N)

$$x_k = \begin{bmatrix} x_{11}^k & x_{12}^k & \ldots & x_{1N}^k \\ x_{21}^k & x_{22}^k & \ldots & x_{2N}^k \\ \ldots & \ldots & \ldots & \ldots \\ x_{P1}^k & x_{P2}^k & \ldots & x_{PN}^k \end{bmatrix} = [\bar{x}_k(1), \bar{x}_k(2), \ldots, \bar{x}_k(N)],$$

where the $\bar{x}k(j)=[x_{1j}^k x_{2j}^k \ldots x_{Pj}^k]'$, j=1, 2, . . . , N, k=1, 2, . . . , T for each word $W_{nkm}$ is grouped by word and SNR level to form the r entries in each of the corresponding us codebooks 309. The $\bar{x}k(j)=[x_{1j}^k x_{2j}^k \ldots x_{Pj}^k]'$, j=1, 2, . . . , N, k=1, 2, . . . , T for each word $W_{nkm}$ is grouped by word to form the rs entries for each of the corresponding u FMQ 308 codebooks. The $\bar{x}k(j)$ for each word entry in a codebook is processed using, for example, the LBG algorithm, to yield a C-cell partitioning of the matrix space for each codebook and V-matrix entries containing C $v_i$, i=1,2, . . . ,C, P×N, codeword matrices $$v_i = \begin{bmatrix} v_{11}^i & v_{12}^i & \ldots & v_{1N}^i \\ v_{21}^i & v_{22}^i & \ldots & v_{2N}^i \\ \ldots & \ldots & \ldots & \ldots \\ v_{P1}^i & v_{P2}^i & \ldots & v_{PN}^i \end{bmatrix} = [\bar{v}_i(1), \bar{v}_i(2), \ldots, \bar{v}_i(N)],$$

where $\bar{v}k(j)=[x_{1j}^i x_{2j}^i \ldots x_{Pj}^i]'$, j=1,2, . . . ,N.

Continuing the training process of speech recognition system 300, each of the training word $W_{nkm}$ entries in the urs training word database are provided as a respective speech signal 304 training word. Quantization of a word $W_{nkm}$ occurs in the same manner for each codebook of codebooks 308 and 309. Each training speech signal 304 is preprocessed by preprocess operation 312, and LPC coefficients are determined in LPC operation 316 as described above. Each of the LPC coefficients are converted into respective line spectral pair frequencies by LSP operation 317. Each of the training words $W_{nkm}$ is represented by a respective set of the TO speech spectral vectors for each frame of each speech signal 304 word $W_{nkm}$, which result in a set X={$x_1,x_2, \ldots ,x_T$} of T, P×N matrices for each speech signal 304 word $W_{nkm}$, where T=int(TO/N).

A non-fuzzy matrix quantization of X can be described by a C×T classification matrix U of elements:

$$u_{ik} = \begin{cases} 0, & Xk \notin Ai \quad i = 1, 2, \ldots, C \\ 1, & Xk \in Ai \quad k = 1, 2, \ldots, T. \end{cases}$$

Furthermore, the elements of this MQ matrix satisfy the following two conditions:

a)

$$\sum_{i=1}^{C} u_{ik} = 1,$$

i.e., only one element in a column is equal to one; the remaining elements are zero. This implies that each matrix $x_k$ is "quantized" to only one centroid of the matrix space.

b)

$$\sum_{k=1}^{T} u_{ik} > 0;$$

this ensures that there is no empty cell in this C-class partitioning of the matrix space.

The columns of indices $O_j$, j=1,2, . . . ,T, of the classification matrix U "map" effectively an input matrix $x_j$ into a vector $O_j$={$u_{1j},u_{2j}, \ldots ,u_{Cj}$} with all zero values except one element $u_{ij}$=1 indicating that the distance $$J(O_j, V) = \sum_{i=1}^{C} u_{ij} d(x_j, v_i)$$

between $x_j$ and the ith cell is minimized. Note that each of the columns of relative closeness indices $O_j$, j=1,2, . . . ,T, represents the input signal 304 at different instances in time. $d(x_j, v_j)$ is the distance measure $$d(x_j, v_i) = \frac{1}{P}\sum_{m=1}^{P} d(\overline{x}_j(n), \overline{v}_i(n))$$

and, for example, the distance measure $$d(\overline{x}_j(n), \overline{v}_i(n)) = \sum_{m=1}^{P} (x_{mn}^j - v_{mn}^i)^2.$$

This distance measure is the distance between the jth column vector $x_j$ and $v_i$, which is the centroid of the ith cell. Note that for a non-fuzzy MQ codebook, an optimum partition of the matrix space of codebooks 308 and 309 into respective C cells ensures that $$J(U, V) = \sum_{j=1}^{T}\sum_{i=1}^{C} u_{ij} d(x_j, v_i)$$

is minimized. Different distance measures utilize different quantization mechanisms for computing the "centroid" matrices $v_i$.

The fuzzy matrix quantization of each of the training words $W_{nkm}$ X for respective codebooks 308 and 309 is described by a C×T fuzzy classification matrix $U_F$ with elements $u_{ik} \in [0,1]$, i=1,2, . . . ,C, k=1,2, . . . ,T. The value of $u_{ik}$, $0 \leq u_{ik} \leq 1$, indicates the degree of fuzziness of the kth input matrix $x_k$ to the ith partitioning cell which is represented by the centroid $v_i$. The two conditions are also satisfied:

$$\sum_{i=1}^{Cu} u_{ik} = 1 \text{ and } \sum_{k=1}^{T} u_{ik} > 0$$

In this case, $u_{ik}$ is derived as:

$$u_{ik} = \frac{1}{\sum_{k=1}^{C} \left(\frac{d_{ik}(x_k, v_i)}{d_{jk}(x_k, v_i)}\right)^{\frac{1}{(F-1)}}}.$$

where the constant F influences the degree of fuzziness. $d_{ik}(x_k, v_j)$ are the average distance measures as defined with reference to the MQ design.

The columns of probability mass vectors $O_j$ of the classification matrix $U_F$ "map" an input matrix $x_j$ into a probability mass vector of indices $O_j = \{u_{1j}, u_{2j}, \ldots, u_{Cj}\}$ which results in the distance $$J(O_j, V) = \sum_{i=1}^{C} u_{ij}^F d(x_j, v_i).$$

When using LSP based distance measures, $d(x_j, v_i)$ equals $$dLSP = \sum_{i=1}^{P} (f_R(i) - f_S(i))^2$$

or $$dWLSP = \sum_{i=1}^{P} w(i)(f_R(i) - f_S(i))^2$$

Additionally, $d(x_j, v_i)$ may be the robust distance measure described in a concurrently filed U.S. patent application Ser. No. 08/883,980, filed Jun. 27, 1997, entitled "Robust Distance Measure in a Speech Recognition System" by Safdar M. Asghar and Lin Cong, which is incorporated herein in its entirety.

Furthermore, the overall distance of the C entries of a fuzzy matrix quantizer codebook operating on the X matrix set for a single word $W_{nkm}$ is $$FD = J(U, V) = \sum_{j=1}^{T}\sum_{i=1}^{C} u_{ij}^F d(x_j, v_i).$$

Note that the summation of $O_j$ entries is equal to unity. The largest component of $O_j$ is the one which corresponds to the codeword with the smallest $d(x_j, v_i)$ value. $O_j$ can be interpreted as a probability mass vector relating the input matrix $x_j$ to all $v_i$, i=1,2, . . . ,C. The total observation sequence $O_n$ of probability mass vectors for each speech signal 304 word for one codebook is defined as $O_n = \{O_1, O_2, \ldots, O_T\}$, $O_j = \{u_{1j}, u_{2j}, \ldots, u_{Cj}\}$.

A fuzzy distance measure $FD_n^k$, n=1, 2, . . . , u (words) and k=1, 2, . . . , s (acoustic noise levels) between an input speech signal 304 word and nth of the respective u codebooks at a respective kth of the s SNR levels in FMQ 307 is formed as:

$$FD_n^k = \frac{1}{T}\sum_{j=1}^{T}\sum_{i=1}^{C} u_{ij} d(x_j, v_i).$$

A fuzzy distance measure between an input speech signal 304 and each of the respective u codebooks in FMQ 308 $FD_n$, n=1, 2, . . . , u, is formed as:

$$FD_n = \frac{1}{T}\sum_{j=1}^{T}\sum_{i=1}^{C} u_{ij} d(x_j, v_i).$$

Equations $J(U, V) = \sum_{j=1}^{T}\sum_{i=1}^{C} u_{ij} d(x_j, v_i)$ and $$J(U, V) = \sum_{j=1}^{T}\sum_{i=1}^{C} u_{ij}^F d(x_j, v_i)$$

respectively provide the MQ and FMQ distance and can also be represented by the general distance equation:

$$J(W, V) = \sum_{j=1}^{T}\sum_{i=1}^{C} w_{ij} d(x_j, v_i),$$

where $$w_{ij} = \begin{cases} u_{ij} & u_{ij} \in \{0, 1\} \\ u_{ij}^F & u_{ij} \in [0, 1] \end{cases}$$

Fuzzy matrix quantization is further illustratively discussed in Xydeas and Cong, "Robust Speech Recognition in a Car Environment," International Conf. on Digital Signal Processing,, Vol. 1, pp. 84–89, June, 1995, Cyprus, which is herein incorporated by reference in its entirety.

During the training mode of speech recognition system 300, the training input data for the hidden Markov models of classifier HMMs 306 are in one embodiment the observation sequences $O_n$ of probability mass vectors $O_j$ from a classification matrix U. Each classification matrix U is generated by FMQ 308 u codebooks from a fuzzy matrix quantized speech input signal for each of the training words $W_{nkm}$ as described above. HMMs 306 have a respective process $\lambda_n$, n=1, 2, ..., u, for each of the u words. The rs words for each respective u vocabulary words are, in one embodiment, fuzzy matrix quantized to train a corresponding HMM process $\lambda_n$. The multiple arrows from FMQ 307 to HMMs 306 indicate that all SNR levels of the ur training words are used to train each of the HMM processes $\lambda_n$. Each of the observation sequences $O_n$ from FMQ 308 for each of the urs training words train corresponding HMM processes, $\lambda_n$, n=1, 2, ..., u, i.e. for an nth single word input signal, an input observation sequence $O_n$ to an HMM $\lambda_n$ only comes from one codebook n. Fuzzy Viterbi algorithm operation 310, described in section 4.3 of L. Cong, "A Study of Robust IWSR Systems" utilizes a respective observation sequence $O_n$ from each of the rs versions of each of the u words and a fuzzy Viterbi algorithm to produce a maximum likelihood probability $Pr(O_n|\lambda_n)$ of the HMM process $\lambda_n$ producing the observation sequence $O_n$. Separate HMMs may be built for males and females, and the number of states of each HMM is set to, for example, five. HMM training is further described in chapter 2 and chapter 4, section 4.3 of L. Cong, "A Study of Robust IWSR systems".

In one embodiment neural network 302 is a multilayer perceptron type NN. Multilayer networks overcome many of the limitations of single-layer networks. That is, multilayered, hierarchical networks are more powerful because of the nonlinearities and the internal representation generated in the so-called hidden layers. The multiple nodes in the output layer typically correspond to multiple classes in the multi-class pattern recognition problem. In general, an MLP neural network 302 has an ability to partition an input pattern space in a classification problem and to represent relationships between events. Additionally, MLP neural network 302 with multiple layers and sufficient interconnections between nodes ensures an ability to "learn" complex classification boundaries, and implement nonlinear transformations for functional approximation problems. The MLP neural network 302 has G hidden nodes where G is preferably determined empirically based upon the number of u vocabulary words, memory size, and processing capabilities.

The MLP neural network 302 is trained using a variety of selective mixes of individual input data respectively generated using each of the sr versions of the u vocabulary words in the training database. When one of the urs training words is input to speech recognition system 300 as speech signal 304, preprocess operation 312 preprocesses speech signal 304 and LPC operation 316 determines the prediction coefficients for each of the TO speech input signal frames of speech signal 304. Each of the LPC coefficients for each frame are respectively converted into respective line spectral pair frequencies by LSP operation 317.

Referring to FIG. 3, during training of MLP neural network 302 for speech recognition system 300, if fuzzy distance measure input data is selected, u fuzzy distance measures $\{FD\}_k$ input data is used. The us FMQ 309 codebooks are used to determine a respective fuzzy distance measures $FD_n^k$ between each of the r versions of an nth vocabulary word al the kth SNR level using the nth set of FMQ 309 codebooks designed at the kth SNR level. For example, if the nth vocabulary word is "ten" and is corrupted by an SNR level of 06 dB, then the u codebooks designed at the 06 dB SNR level are used to compute the u fuzzy distance measures $FD_z^k$ which may be selectively used as respective input data to u nodes of the MLP neural network 302.

Figure 4:
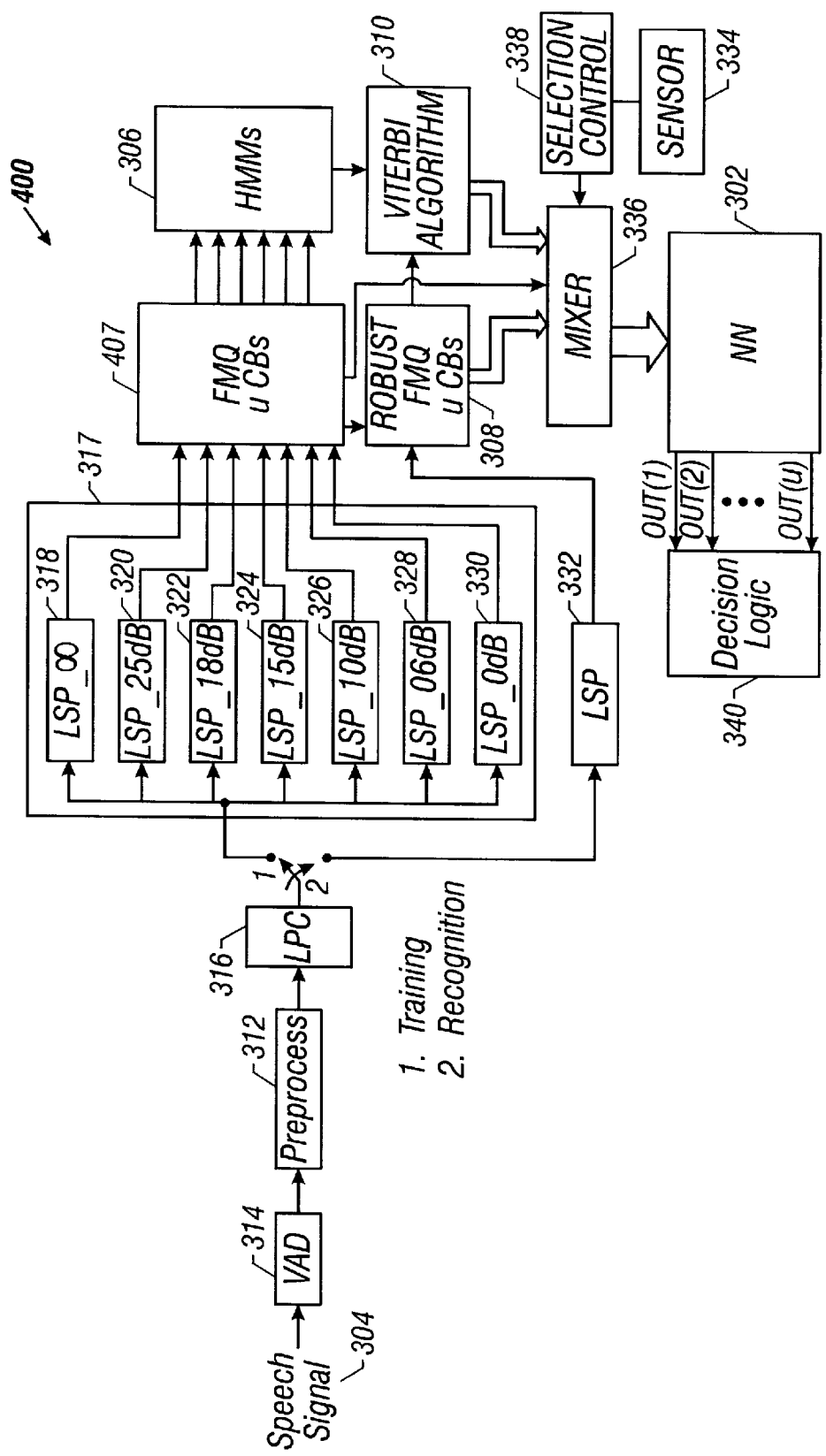
FIG. 4 illustrates another FMQ/HMM/NN speech recognition embodiment with selective data input to the NN using a single codebook per vocabulary word.

Referring to FIG. 4, in another embodiment of a speech recognition system, speech recognition system 400 is identical to speech recognition system 300 except that FMQ 407 replaces FMQ 307. FMQ 407 has u codebooks that are identical to the u codebooks 308. Designing of the u codebooks of FMQ 407 is identical to the designing of the respective, corresponding u codebooks 308. Quantization using the u codebooks of FMQ 407 is identical to quantization using respective, corresponding u codebooks 308.

The MLP neural network 302 for speech recognition system 400 is trained using a variety of selective mixes of individual input data respectively generated using each of the sr versions of the u vocabulary words in the training database. When one of the urs input speech signal 304 training words is input to speech recognition system 300 as speech signal 304, preprocess operation 312 preprocesses speech signal 304 and LPC operation 316 determines the prediction coefficients for each of the TO speech input signal frames of speech signal 304. Each of the LPC coefficients for each frame are respectively converted into respective line spectral pair frequencies by LSP operation 317.

During training of MLP neural network 302, urs input speech signal 304 training database words are used to train MLP neural network 302. FMQ 407 is used to determine a respective fuzzy distance measure $FD_n$ between each of the urs input speech signal 304 words and the respective u FMQ 407 codebooks. Thus, each of the u codebooks in FMQ 407 are used to determine a fuzzy distance measure $FD_n$ for each version of each input signal 304 word at each SNR level. The u fuzzy distance measures, $\{FD\}_n$, one from each of the u FMQ 407 codebooks, for each of the urs input signal 304 words may be respectively selected, in accordance with Table 2, to train MLP neural network 302. For example, if the nth vocabulary word is "ten" and is corrupted by an SNR level of 06 dB, then the u codebooks of FMQ 407 are used to compute the u respective fuzzy distance measures $\{FD\}_n$ which may be selectively used as respective input data to u nodes of the MLP neural network 302. If the nth vocabulary word is "ten" and is corrupted by an SNR level of 12 dB, then the u codebooks of FMQ 407 are used to compute the respective u fuzzy distance measures $\{FD\}_n$ which may be selectively used as respective input data to u nodes of the MLP neural network 302, and so on. Thus, during training of MLP neural network 302, each of the u codebooks of FMQ 407 produces rs fuzzy distance measures for each of the u vocabulary words.

Referring to FIGS. 3 and 4, during training of MLP neural network 302, if maximum likelihood probability input data derived from the u HMM processes $\lambda_n$ of HMMs 306 is selected, each of the u HMM processes $\lambda_n$ receive an observation sequence $O_n$ from FMQ 308 (FMQ 407, FIG. 4). The u maximum likelihood probabilities {PROB} generated by fuzzy Viterbi algorithm 310, as described above, from each of the u HMM processes $\lambda_n$ are used as input data to u nodes of the MLP neural network 302.

MLP neural network 302 provides u output signals, OUT(1), OUT(2), ..., OUT(u), which assume values in the region $0 \leq OUT(n) \leq 1$, n=1, 2, ..., u. The maxOUT(n) represents the classification of speech signal 304 as the nth vocabulary word.

Referring to FIG. 3, during training, mixer 336 provides several different mixes of input data selected from FMQ 308/HMMs 306 and FMQ 309 codebooks to MLP neural network 302 of speech recognition system 300. Seven illustrative mixes are defined in Table 1.

TABLE 1

| MIX | MLP neural network 302 Input Data |
| --- | --- |
| MIX1 | {FD}$_k$ |
| MIX2 | {PROB} |
| MIX3 | {COM} |
| MIX4 | {FD, PROB} |
| MIX5 | {FD, COM} |
| MIX6 | {PROB, COM} |
| MIX7 | {FD, PROB, COM} |

MIX1 represents that the u fuzzy distance measures {FD}$_k$ for a given vocabulary word at a kth SNR level are directly applied to u input nodes of MLP neural network 302. MIX2 represents that for a given vocabulary word all of the u HMMs 306 Pr' $(O_n|\lambda_n)$ maximum likelihood probabilities applied directly to the u MLP neural network 302 input nodes. MIX3 represents that a combination {COM} of the u fuzzy distance measures {FD}$_k$ and u maximum likelihood probabilities {PROB} are applied to the u MLP neural network 302 input nodes. Each entry of the combination {COM} is defined by $FD_n^k - \alpha Pr'(O_n|\lambda_n)$ for n=1, 2, ..., u, where $\alpha$ is a scaling constant. MIX4 applies each entry of MIX 1 and MIX 2 to 2u respective MLP neural network 302 input nodes. MIX 5 applies each entry of MIX 1 and MIX 3 to 2u respective MLP neural network 302 input nodes. MIX6 applies each entry of MIX 2 and MIX 3 to 2u respective MLP neural network 302 input nodes. MIX7 applies each entry of MIX 1, MIX2, and MIX 3 to 3u respective MLP neural network 302 input nodes.

Referring lo FIG. 4, during training, mixer 336 provides several different mixes of input data selected from FMQ 407/HMMs 306 and FMQ 407 codebooks to MLP neural network 302 of speech recognition system 400. Seven illustrative mixes are defined in Table 2.

TABLE 2

| MIX | MLP neural network 302 Input Data |
| --- | --- |
| MIX1 | {FD}$_n$ |
| MIX2 | {PROB} |
| MIX3 | {COM} |
| MIX4 | {FD$_n$, PROB} |
| MIX5 | {FD$_n$, COM} |
| MIX6 | {PROB, COM} |
| MIX7 | {FD, PROB, COM} |

MIX1 represents that the u fuzzy distance measures {FD}$_n$ for a given vocabulary word are directly applied to u input nodes of MLP neural network 302. MIX2 represents that for a given vocabulary word all of the u HMMs 306 Pr'$(O_n|\lambda_n)$ maximum likelihood probabilities applied directly to the u MLP neural network 302 input nodes. MIX3 represents that a combination {COM} of the u fuzzy distance measures {FD}$_n$ and u maximum likelihood probabilities {PROB} are applied to the u MLP neural network 302 input nodes. Each entry of the combination {COM} is defined by $FD_n - \alpha Pr'(O_n|\lambda_n)$ for n=1, 2, ..., u, where $\alpha$ is a scaling constant. MIX4 applies each entry of MIX 1 and MIX 2 to 2u respective MLP neural network 302 input nodes. MIX 5 applies each entry of MIX 1 and MIX 3 to 2u respective MLP neural network 302 input nodes. MIX6 applies each entry of MIX 2 and MIX 3 to 2u respective MLP neural network 302 input nodes. MIX7applies each entry of MIX 1, MIX2, and MIX 3 to 3u respective MLP neural network 302 input nodes.

Referring to FIGS. 3 and 4, the speech classifier MLP neural network 302 accepts mixed input data and is appropriately designed using the well-known back propagation algorithm. The MLP neural network 302 is trained for the nth vocabulary word, using the back propagation algorithm, with the s SNR values of each of the r single word versions.

After training the speech recognition system 300, path 2 is selected to initiate a speech signal 304 recognition process. When any speech signal 304 word $W_n$ is spoken by a user, VAD 314 effectively defines end points of input words for IWSR. Speech input signal 304 word $W_n$ is next preprocessed by preprocess operation 312 as described above. Word $W_n$ is sampled at, for example, 8 ksamples/sec, and segmented into TO frames, each frame, t seconds, such as 20 msec with a 10 msec overlap of each consecutive frame, of $W_n$. LPC operation 316 generates P LPC coefficients for each frame of the $W_n$, and LSP operation 332 generates Pth order LSP coefficients from the LPC coefficients as described above.

FMQ 308 utilizes interframe information related to the "evolution" of the speech short-term spectra envelopes of speech signal 304 word $W_n$ by operating on N consecutive speech frames of word $W_n$. Since each frame is represented by the P order LSP coefficients, and N frames of speech input signal segment of word $W_n$ provide. Each of T of speech signal 304 word $W_n$ is represented by a P×N matrix of LSP coefficients, where T=int(TO/N). Word $W_n$ may, thus, be represented as a matrix $X_{Wn} = \{x_1, x_2, \ldots, x_T\}$ of T, P×N matrices for each speech signal 304 word $W_{nkm}$, where each of the T, P×N matrices is defined as:

$$x_k = \begin{bmatrix} x_{11}^k & x_{12}^k & \cdots & x_{1N}^k \\ x_{21}^k & x_{22}^k & \cdots & x_{2N}^k \\ \cdots & \cdots & \cdots & \cdots \\ x_{P1}^k & x_{P2}^k & \cdots & x_{PN}^k \end{bmatrix} = [\bar{x}_k(1), \bar{x}_k(2), \ldots, \bar{x}_k(N)],$$

where $\bar{x}k(j) = [x_{1j}^k x_{2j}^k \ldots x_{Pj}^k]'$, j=1, 2, ..., N, k=1, 2, ..., T.

FMQ 308 fuzzy matrix quantizes the matrix representation $X_{Wn} = \bar{x}k(j)$ of word $W_n$ with the designed C codebook entries for each of the u codebooks. FMQ 308 produces the distance measure $FD_n$ for each of u fuzzy matrix codebooks in FMQ 308 with the smallest distance measure $FD_n$ indicating which of the u codebooks is closest to $W_n$. FMQ 308 also yields an observation sequence $O_n$ of T probability mass vectors $O_j$ for each of the u codebooks as discussed above. Observation sequence $O_n$ is used as input data by a fuzzy Viterbi algorithm 310 operating on each of the HMM $\lambda_n$ processes of HMMs 306. The u outputs of the fuzzy Viterbi algorithm 310 are the maximum likelihood probability Pr' $(O_n|\lambda_n)$ measures that $\lambda_n$ corresponds to $W_n$.

The different MIXes in Tables 1 and 2 provide incremental increases in speech recognition accuracy as well as increases in processing time for a given speech recognition system 300 processor. The speech recognition accuracy of all MIXes are nominally the same at high SNR ratios. Speech recognition system 300 adjusts the input data mix to MLP neural network 302 in accordance with various performance and recognition accuracy affecting factors. One such factor is acoustic noise SNRs. Relatively large acoustic noise ratios tend to decrease the recognition accuracy of speech recognition system 300 for a given MIX. Accordingly, increasing the amount of data increases the recognition accuracy of speech recognition system 300 but decreases the speed performance of speech recognition system 300. Another such factor is the size u of the vocabulary of speech recognition system 300. As u is increased, less input data may be used to increase the speed performance of speech recognition system 300 when speed performance becomes an issue for a user. Selection control circuit 338 preferably optimally balances speech recognition accuracy with desirable processing speed.

Sensor 334 detects an acoustic noise level in an operating environment of speech recognition system 300 and provides a corresponding input signal to selection control circuit 338. Section control logic 338 utilizes the noise level information to select the MIX in Tables 1 and 2 that will yield a predetermined speech recognition accuracy in the least amount of time.

After making the proper determination, selection control circuit 338 provides the appropriate MIX to MLP neural network 302. MLP neural network 302 then provides u output signals, OUT(1), OUT(2), . . . , OUT(u), which assume values in the region $0 \leq OUT(n) \leq 1$. Decision logic 340 classifies $W_n$ as the nth vocabulary word if OUT(n)= max{OUT(1), OUT(2), . . . , OUT(u)}.

The ability to selectively control the input mixes to a speech classifier offers flexibility of a speech recognition system, such as speech recognition systems 300 and 400, to adapt to varying environmental conditions and system platform constraints, where the system platform may include one or more processors executing code in memory to implement speech recognition system 300 and speech recognition system 400, respectively. For example, in a car environment, noise levels change at different traveling speeds with general predictability. The selection control circuit 338 may in one embodiment receive car speed input data and access a database of information relating to noise levels at various traveling speeds. The noise level information corresponding to the car speed may be retrieved and utilized by selection control circuit 338 to select the mix from Table 1 that provides a satisfactory recognition rate in preferably the least amount of time. Additionally, if an unsatisfactory performance speed is detected by, for example, speech recognition systems 300 or 400, respectively, the MIX in Table 1 or Table 2, respectively, may be selected to raise performance speed to a predetermined satisfactory level. An unsatisfactory performance speed may arise when, for example, the size of the vocabulary u and the selected MIX requires computational resources that are at least temporarily unavailable.

It will be recognized that a variety of other factors in addition to vocabulary size and dynamically detected SNR levels may affect recognition accuracy. Accordingly, selection control circuit 338 may be designed to select an appropriate mix of input data to a speech classifier to accommodate these other factors as well. Also, other speech preprocessors, such as fuzzy and non fuzzy vector quantizers, and speech classifiers may be used in addition to or in substitution of the speech preprocessors ((MQ, FMQ)/HMM) discussed herein.

While the invention has been described with respect to the embodiments and variations set forth above, these embodiments and variations are illustrative and the invention is not to be considered limited in scope to these embodiments and variations. For example, other types of speech preprocessors may be used to provide output data which may be appropriately mixed, such as the single robust codebook/HMM preprocessor described in a currently filed U.S. patent application Ser. No. 08/883,979, filed Jun. 27, 1997, entitled "Speech Recognition System Using a Single Robust Codebook" by Saldar M. Asghar and Lin Cong, which is incorporated herein in its entirety. Also, it will be recognized that additional combinations of data other than as listed in Table 1 may be generated. Accordingly, various other embodiments and modifications and improvements not described herein may be within the spirit and scope of the present invention, as defined by the following claims.

What is claimed is:

1. A speech recognition system comprising:
   a first speech signal preprocessor to receive first input data representing a speech input signal and having first speech input signal preclassifying output data;
   a second speech signal preprocessor to receive second input data representing the speech input signal and having second speech input signal preclassifying output data;
   a mixer to receive the first and second speech input signal preclassifying output data and having output data represented by a selected mix of the first and second speech input signal preclassifying output data;
   a selection control circuit coupled to the mixer to determine the selected mix of the first and second speech input signal preclassifying output data by determining an appropriate balance between speech recognition accuracy of the speech recognition system and a speech recognition processing speed of the speech recognition system; and
   a speech classifier to receive the selected mix and having output data to classify the speech input signal as recognized speech.

2. The speech recognition system of claim 1 wherein the selection control circuit is capable of dynamically selecting the selected mix based on predetermined parameters.

3. The speech recognition system of claim 1 further comprising:
   a noise level detection sensor to provide a noise level parameter output signal to the selection control circuit.

4. The speech recognition system of claim 1 wherein the first speech signal preprocessor comprises:
   a fuzzy matrix quantizer, wherein the first speech input signal preclassifying output data of the fuzzy matrix quantizer are fuzzy distance measures between a speech input signal representation matrix and respective fuzzy matrix codebooks.

5. The speech recognition system of claim 1 wherein the second speech signal preprocessor comprises:
   a plurality of hidden Markov models each modeling a respective word in a predetermined vocabulary, wherein the second input data representing the speech input signal is an observation sequence produced by the first speech signal preprocessor; and
   a probability module to determine respective probabilities of each hidden Markov model producing the observation sequence representing the speech input signal.

6. The speech recognition system of claim 5 wherein the probability module includes a Viterbi algorithm.

7. The speech recognition system of claim 1 wherein the first input data representing the speech input signal comprises X order line spectral pair coefficients.

8. The speech recognition system of claim 1 wherein the speech classifier is a multilevel perceptron neural network.

9. The speech recognition system of claim 1 wherein the selected mix of the first and second speech input signal preclassifying output data is selected from the group comprised of (i) the first speech input signal preclassifying output data alone, (ii) the second speech input signal preclassifying output data alone, (iii) a combination of the first and second speech input signal preclassifying output data, (iv) the first speech input signal preclassifying output data and the second speech input signal preclassifying output data, (v) the first speech input signal preclassifying output data and the combination of the first and second speech input signal preclassifying output data, (vi) the second speech input signal preclassifying output data and the combination of the first and second speech input signal preclassifying output data, and (vii) the first speech input signal preclassifying output data, the combination of the first and second speech input signal preclassifying output data, and the second speech input signal preclassifying output data.

10. The speech recognition system of claim 1 wherein the first speech input signal preclassifying output data is fuzzy distance measures between the first input data representing the speech input signal and respective reference codebooks of the first speech signal preprocessor.

11. The speech recognition system of claim 1 further comprising:

decision logic coupled to the speech classifier to receive the output data from the speech classifier and to classify the speech input signal as a word selected from a predetermined vocabulary.

12. The speech recognition system of claim 1 further comprising:

a processor;

a memory coupled to the processor and having processor executable code for implementing the first and second speech signal preprocessors, the mixer and the speech classifier.

13. The speech recognition system of claim 1 wherein the selection control circuit is capable of determining an appropriate balance between the speech recognition accuracy of the speech recognition system and the speech recognition processing speed of the speech recognition system in accordance with factors affecting speech recognition accuracy and speech recognition processing speed, wherein such factors are selected from the group comprising a vocabulary size of the speech recognition system and noise levels of an environment of the speech recognition system.

14. A speech recognition system comprising:

a speech input signal feature extractor to provide parameters representing features of T groups of N speech input signal frames;

a vocabulary of u words;

a matrix quantizer to receive the parameters and to provide (i) a series of observation sequences for each of the T groups of the N speech input signal frames and (ii) distance measure output data between the parameters and u respective matrix codebooks;

a plurality of u hidden Markov models coupled to the matrix quantizer to receive the observation sequences;

a Viterbi algorithm module to receive the observation sequences and provide respective probabilities that the respective hidden Markov models produced a respective observation sequence;

a selection control circuit to determine when the distance measure output, the probabilities, and a combination of the distance measure output and the probabilities are included in a plurality of selected mixes by determining an appropriate balance between speech recognition accuracy of the speech recognition system and a speech recognition processing speed of the speech recognition system;

a mixer coupled to the matrix quantizer and the Viterbi algorithm module for mixing the distance measure output and the probabilities into one set of mixed output data based on the selected mixes; and a neural network coupled to the mixer to receive the mixed output data set and determine which of the u vocabulary words most probably represents the speech input signal.

15. The speech recognition system of claim 14 wherein the matrix quantizer is a fuzzy matrix quantizer, the distance measures are fuzzy distance measures, and the observation sequence is a vector of indices representing the relative closeness of each of the parameters and codewords in the respective matrix codebooks.

16. The speech recognition system of claim 14 wherein the predetermined mixed output data sets include:

(i) the distance measure output preclassifying output data alone, (ii) the probabilities preclassifying output data alone, (iii) a combination of the distance measure output and probabilities preclassifying output data, (iv) the distance measure output preclassifying output data and the probabilities preclassifying output data, (v) the distance measure output preclassifying output data and the combination of the distance measure output and probabilities preclassifying output data, (vi) the probabilities preclassifying output data and the combination of the distance measure output and probabilities preclassifying output data, and (vii) the distance measure output preclassifying output data, the combination of the distance measure output and probabilities preclassifying output data, and the probabilities preclassifying output data.

17. The speech recognition system of claim 14 wherein the speech input signal feature extractor comprises:

an X order linear predictive code (LPC) module to determine X LPC coefficients; and a line spectral pair (LSP) module to determine X LSPs from the X LPC coefficients.

18. The speech recognition system of claim 14 wherein the selection control circuit is capable of determining an appropriate, balance between the speech recognition accuracy of the speech recognition system and the speech recognition processing speed of the speech recognition system in accordance with factors affecting speech recognition accuracy and speech recognition processing speed, wherein such factors are selected from the group comprising a vocabulary size of the speech recognition system and noise levels of an environment of the speech recognition system.

19. The speech recognition system of claim 14 further comprising a noise level detector to provide a noise level parameter output signal to the selection control circuit.

20. A speech recognition system comprising:

means for processing first speech input signal data to preclassify the speech input signal and produce first preclassification output data, wherein the first speech input signal data represents a speech input signal;

means for processing second speech input signal data to preclassify the speech input signal and produce second preclassification output data;

means, coupled to both means for processing, for determining when to include the first speech input signal, the second speech input signal, and a combination of the first and second speech input signals in a preferred mix of the preclassification output data by determining an appropriate balance between speech recognition accuracy of the speech recognition system and a speech recognition processing speed of the speech recognition system;

means, coupled to the means for determining, for mixing the first and second preclassification output data in accordance with the determined preferred mix;

means, coupled to the means for mixing, for classifying the speech input signal based on the preferred mix of preclassification output data.

21. The speech recognition system of claim 20 further comprising means to provide a noise level parameter output signal to the means for determining.

22. A speech recognition method comprising the steps of:

processing first speech input signal data to preclassify the speech input signal and produce first preclassification output data, wherein the first speech input signal data represents a speech input signal;

processing second speech input signal data to preclassify the speech input signal and produce second preclassification output data;

determining when to include the first speech input signal, the second speech input signal, and a combination of the first and second speech input signals in a preferred mix of the preclassification output data by determining at least an appropriate balance between speech recognition accuracy and a speech recognition processing speed;

mixing the first and second preclassification output data in accordance with the preferred mix; and classifying the speech input signal based on the preferred mix of preclassification output data.

23. The speech recognition method of claim 22 wherein step of processing first speech input signal data comprises the step of:

fuzzy matrix quantizing a plurality of the first speech input signal data;

determining a fuzzy distance measure between the fuzzy matrix quantized first speech input signal data and a plurality of fuzzy matrix codebooks, wherein the first preclassification output data includes the fuzzy distance measure.

24. The speech recognition method of claim 22 further comprising the steps of:

training a first speech processor for processing the first speech input signal data with temporally related data from speech input signals corrupted with acoustic noise at a plurality of signal to noise ratios;

training a second speech processor for processing the second speech input signal data with temporally related data from the speech input signals corrupted with the acoustic noise at the plurality of signal to noise ratios; and training a speech classifier to classify the speech input signal with a plurality of preclassification output data mixes.

25. The speech recognition method of claim 22 wherein the processing first speech input signal data step further comprises the step of:

determining an observation sequence of indices representing a relative closeness between the first speech input signal data and a plurality of codebooks.

26. The speech recognition method of claim 22 further comprising the steps of:

receiving TO speech input signals, wherein the TO speech input signals define an input speech word;

representing each of the TO speech input signals with P LSP coefficients;

representing each group of N frames of the speech input signals with a respective P×N matrix;

determining the relative closeness between each P×N matrix and each codeword in a fuzzy matrix codebook, wherein an observation sequence vector of indices is produced for each P×N matrix, and the indices are the second speech input signal data;

determining a distance between each P×N matrix and each of the codewords; and weighting the distance between each P×N matrix and each of the codewords with respective indices of the observation sequence vector corresponding to the respective P×N matrix to obtain an overall fuzzy distance measure, wherein the fuzzy distance measure is the first preclassification output data.

27. The speech recognition method of claim 22 wherein the step of determining the preferred mix of the preclassification output data comprises the steps of:

selecting a mix of the preclassification output data to obtain a predetermined satisfactory recognition accuracy in the least amount of time.

28. The speech recognition method of claim 27 wherein the preferred mix is selected from the group comprising (i) the first speech input signal preclassifying output data alone, (ii) the second speech input signal preclassifying output data alone, (iii) a combination of the first and second speech input signal preclassifying output data, (iv) the first speech input signal preclassifying output data and the second speech input signal preclassifying output data, (v) the first speech input signal preclassifying output data and the combination of the first and second speech input signal preclassifying output data, (vi) the second speech input signal preclassifying output data and the combination of the first and second speech input signal preclassifying output data, and (vii) the first speech input signal preclassifying output data, the combination of the first and second speech input signal preclassifying output data, and the second speech input signal preclassifying output data.

29. The speech recognition method of claim 22 wherein second speech input signal data is an observation sequence of indices of relative closeness of a representation of the speech input signal to codewords in a reference codebook, and the step of processing second speech input signal data comprises the step of:

determining with a fuzzy Viterbi algorithm a respective probability for each of u hidden Markov models that the hidden Markov model produced the observation sequence, wherein the second preclassification output data are the u determined respective probabilities.

30. The speech recognition method of claim 22 wherein the step of classifying the speech input signal comprises the step of:

classifying the speech input signal with a multilayer perceptron neural network.

31. The speech recognition method of claim 22 wherein determining an appropriate balance between the speech recognition accuracy and the speech recognition processing speed comprises utilizing factors affecting speech recognition accuracy and speech recognition processing speed, wherein such factors are selected from the group comprising a vocabulary size and noise levels of an environment.

32. A speech recognition system comprising:
- a first speech signal preprocessor to receive first input data representing a speech input signal and having first speech input signal preclassifying output data;
- a second speech signal preprocessor to receive second input data representing the speech input signal and having second speech input signal preclassifying output data;
- a mixer to receive the first arid second speech input signal preclassifying output data and having output data represented by a selected mix of the first and second speech input signal preclassifying output data;
- a non-neural network selection control circuit coupled to the mixer to determine when to include the first speech input signal, the second speech input signal, and a combination of the first and second speech input signals in the selected mix; and
- a speech classifier to receive the selected mix and having output data to classify the speech input signal as recognized speech.

33. A speech recognition system comprising:
- a first speech signal preprocessor to receive first input data representing a speech input signal and having first speech input signal preclassifying output data;
- a second speech signal preprocessor to receive second input data representing the speech input signal and having second speech input signal preclassifying output data;
- a mixer to receive the first and second speech input signal preclassifying output data and having output data represented by a selected mix of the first and second speech input signal preclassifying output data;
- a selection control circuit coupled to the mixer to determine when to include the first speech input signal, the second speech input signal, and a combination of the first and second speech input signals in the selected mix;
- a speech classifier to receive the selected mix and having output data to classify the speech input signal as recognized speech; and
- a noise level detector to provide a noise level parameter output signal to the selection control circuit.

34. The speech recognition system of claim 33 wherein the noise level detector comprises a noise level detection sensor to detect noise levels which may corrupt at least one of the first input data and the second input data.

35. The speech recognition system of claim 33 wherein the noise level detector comprises:
- a database of noise level information corresponding to noise levels at different traveling speeds of a vehicle; and
- a data retriever to retrieve noise level information from the database of noise level information corresponding to a traveling speed of the vehicle.

* * * * *

UNITED STATES PATENT AND TRADEMARK OFFICE
CERTIFICATE OF CORRECTION

PATENT NO. : 6,044,343
DATED : March 28, 2000
INVENTOR(S) : Asghar, Safdar M.; Cong, Lin It is certified that error appears in the above-identified patent and that said Letters Patent is hereby corrected as shown below:

Column 21,
Line 7, after "environment" add -- of the speech input signal --.

Signed and Sealed this

Fourth Day of September, 2001

Attest:

*Nicholas P. Godici*

*Attesting Officer*

NICHOLAS P. GODICI
*Acting Director of the United States Patent and Trademark Office*